US007953717B2

(12) United States Patent
Graefe

(10) Patent No.: US 7,953,717 B2
(45) Date of Patent: May 31, 2011

(54) HIERARCHICAL LOCKING IN B-TREE INDEXES

(75) Inventor: Goetz Graefe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 12/499,624

(22) Filed: Jul. 8, 2009

(65) Prior Publication Data

US 2009/0271408 A1    Oct. 29, 2009

Related U.S. Application Data

(63) Continuation of application No. 11/539,606, filed on Oct. 6, 2006, now Pat. No. 7,577,658.

(51) Int. Cl.
*G06F 17/30* (2006.01)
(52) U.S. Cl. ........................................ 707/704; 707/797
(58) Field of Classification Search .................. 707/704, 707/797, 999.008, 999.107
See application file for complete search history.

(56) References Cited

U.S. PATENT DOCUMENTS

| | | | | |
|---|---|---|---|---|
| 5,440,732 A * | 8/1995 | Lomet et al. | ........................... | 1/1 |
| 5,960,194 A | 9/1999 | Choy et al. | | |
| 6,144,983 A * | 11/2000 | Klots et al. | ..................... | 718/104 |
| 7,269,588 B1 * | 9/2007 | Verma et al. | ........................... | 1/1 |
| 7,321,898 B1 | 1/2008 | Luo et al. | | |
| 7,577,658 B2 * | 8/2009 | Graefe | .................................. | 1/1 |

OTHER PUBLICATIONS

Gennady Antoshenkov, et al., "Order Preserving String Compression", Proceedings of the Twelfth International Conference on Data Engineering, 1996.

Rudolf Bayer, et al., "Prefix B-Trees", ACM Transactions on Database Systems (TODS), Mar. 1997, vol. 2, Issue 1.

Bishwaranjan Bhattacharjee, et al., "Efficient Query Processing for Multi-Dimensionally Clustered Tables in DB2", Proceedings of the 29th VLDB Conference, Berlin, Germany, 2003.

Michael J. Carey, "Granularity Hierarchies in Concurrency Control", Proceedings of the 2nd ACM SIGACT-SIGMOD symposium on Principles of database systems, 1993.

Michael J. Carey, et al., "Storage Management in EXODUS", Object-Oriented Concepts, Databases and Applications 1989, pp. 341-369.

Douglas Comer, "The Ubiquitous B-Tree", ACM Computing Surveys (CSUR), 1979, vol. 11, No. 2.

K.P. Eswaran, et al., "The Notions of Consistency Looks in a Database System", Communications of the ACM, Nov. 1976, vol. 19, No. 11.

Vibby Gottemukkala, et al., "Locking and Latching in a Memory-Resident Database System", Proceedings of the 18th VLDB Conference, 1992.

Goetz Graefe, "B-tree indexes, interpolation search, and skew", Proceedings of the 2nd International Workshop on Data Management on New Hardware (DaMoN 2006), Jun. 2006.

Goetz Graefe, "Executing nested Queries", 2003.

Goetz Graefe, "Sorting and Indexing with Partitioned B-Trees", Proceedings of the 2003 CIDR Conference, 2003.

Goetz Graefe, et al., "Transaction support for indexed summary views", SIGMOD 2004, Jun. 2004.

(Continued)

*Primary Examiner* — Debbie Le

(57) ABSTRACT

Portions of a B-tree index in a database are locked for concurrency control. In one example, hierarchical lock modes are provided that permit locking a key, a gap between the key and the next key, and a combination of the key and the gap. In another example, key range locking may be applied to the B-tree index using locks on separator keys of index nodes. In another example, key range locking may be applied to the B-tree index using locks on key prefixes.

12 Claims, 14 Drawing Sheets

OTHER PUBLICATIONS

Goetz Graefe, "Write-Optimized B-Trees", Proceedings of the 30th VLDB Conference, 2004.

Jim Gray, et al., "Granularity of Locks in a Large Shared Data Base", Proceedings of the International Conference on Very Large Data Bases, 1975.

J.N. Gray, "Notes on Data Base Operating Systems", IBM Research Laboratory, Lecture Notes in Computer Science, vol. 60, Operating Systems, An Advanced Course, 1978.

Jim Gray, et al., "Transaction Processing: Concepts and Techniques", 1993, pp. 406-421, 851-876.

J.R. Jordan, et al., "Precision Locks", Proceedings of the 1981 ACM SIGMOD international conference on Management of data, 1981.

Ashok M. Joshi, "Adaptive Locking Strategies in a Multi-node Data Sharing Environment", Proceedings of the 17th International conference on Very Large Data Bases, Sep. 1991.

Henry F. Korth, "Locking Primitives in a Database System", Journal of the ACM (JACM), 1983, vol. 30, Issue 1.

Harry Leslie, et al., "Efficient Search of Multidimensional B-Trees", Proceedings of the 21st VLDB Conference, 1995.

David B. Lomet, "Key Range Locking Strategies for Improved Concurrency", Proceedings of the 19th VLDB Conference, 1993.

C. Mohan, et al., "ARIES/IM: An Efficient and High Concurrency Index Management Method Using Write-Ahead Logging", ACM SIGMOD, 1992.

C. Mohan, "ARIES/KLV: A Key-Value Locking Method for Concurrency Control of Multiaction transactions Operating on B-Tree Indexes", Proceedings of the 16th VLDB Conference, 1990.

C. Mohan, et al., "ARIES: A Transaction Recovery Method Supporting Fine-Granularity Locking and Partial Rollbacks Using Wrote-Ahead Logging", ACM Transactions on Database Systems, Mar. 1992, vol. 17, No. 1.

Patrick O'Neil, et al., "Improved Query Performance with Variant Indexes", Proceedings of the 1997 ACM SIGMOD international conference on Management of data, 1997.

Sriram Padmanabham, "Multi-Dimensional Clustering: A New Data Layout Scheme in DB2", Proceedings of the 2003 ACM SIGMOD international conference on Management of data, 2003.

Jaideep Srivastava, et al., "A Tree based Access Method (TBSAM) for Fast Proceeding of Aggregate Queries", Proceedings of the Fourth International Conference on Data Engineering, 1998.

* cited by examiner

EXISITING LOCK MODE

| | S | X | IS | IX |
|---|---|---|---|---|
| S | Y | N | Y | N |
| X | N | N | N | N |
| IS | Y | N | Y | Y |
| IX | N | N | Y | Y |

REQUESTED LOCK MODE

EXISITING LOCK MODE

| | S | X | SØ | ØS | XØ | ØX | SX | XS |
|---|---|---|---|---|---|---|---|---|
| S | Y | N | Y | Y | N | N | N | N |
| X | N | N | N | N | N | N | N | N |
| SØ | Y | N | Y | Y | N | Y | Y | N |
| ØS | Y | N | Y | Y | Y | N | N | Y |
| XØ | N | N | N | Y | N | Y | N | N |
| ØX | N | N | Y | N | Y | N | N | N |
| SX | N | N | Y | N | N | N | N | N |
| XS | N | N | N | Y | N | N | N | N |

REQUESTED LOCK MODE

GRANULARITY CHANGES

1202
LASTNAME, FIRSTNAME

X
ADAMS, FRED
DOLE, MARK
JOHNSON, MIKE

SMITH, SARAH
TORRE, AL
WALKER, JAMES

◄——— INSERT: JOHNSON, SALLY

1204

ØX
ADAMS, FRED
DOLE, MARK
JOHNSON, MIKE

SMITH, SARAH
TORRE, AL
WALKER, JAMES

◄——— INSERT: MILLER, STEVE

1206

FIG. 13
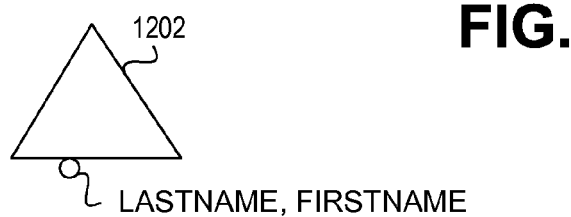
LASTNAME, FIRSTNAME
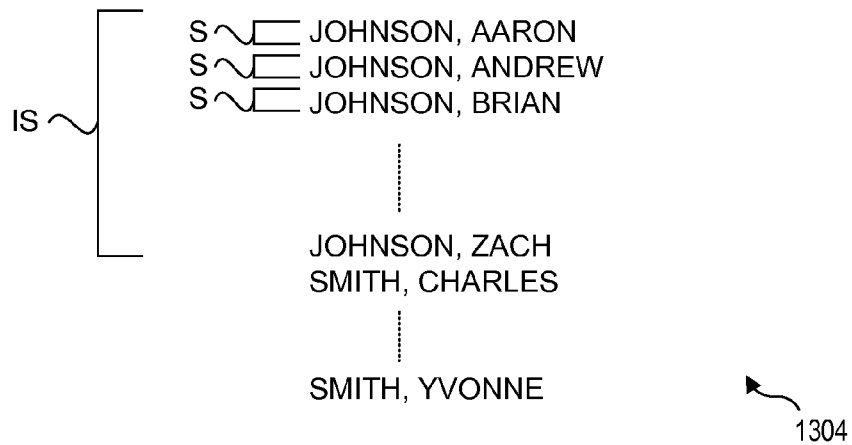
LOCK ESCALATION
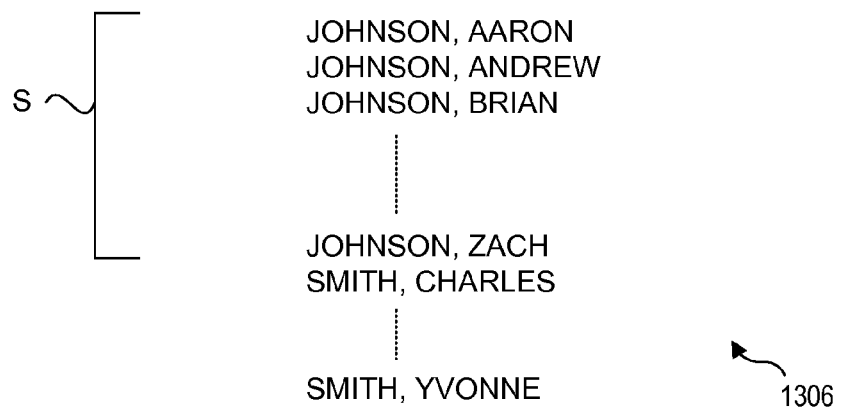

FIG. 14
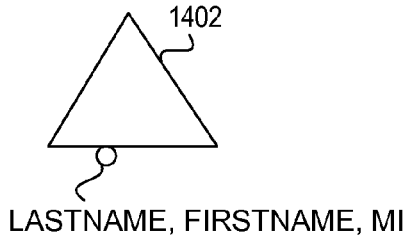
LASTNAME, FIRSTNAME, MI
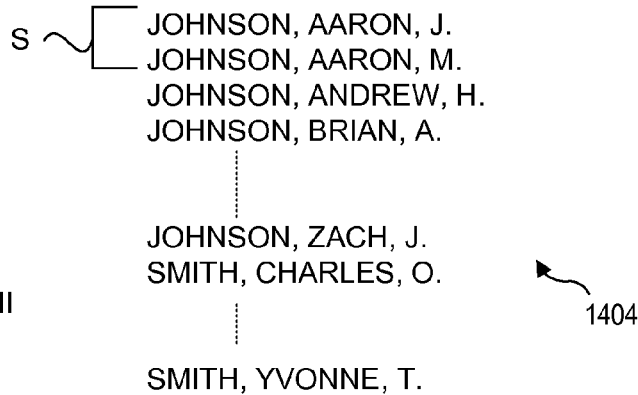
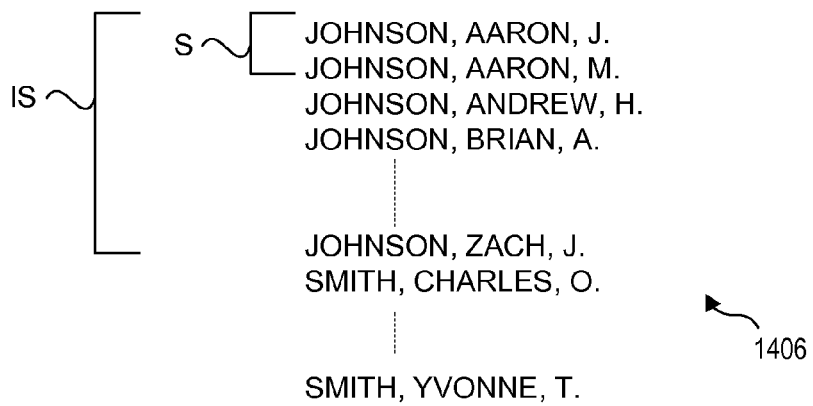
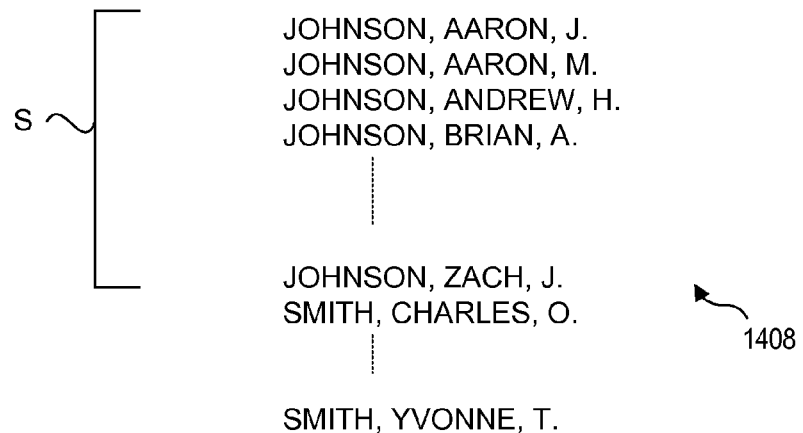

HIERARCHICAL LOCKING IN B-TREE INDEXES

BACKGROUND

Database systems use locks to maintain the consistency of databases when multiple users are accessing the same data at the same time. Before a transaction acquires dependency on the current state of a piece of data, such as by reading or modifying the data, the transaction must protect itself from the effects of another transaction modifying the same data. The transaction may request a lock on the data. The transaction holds the lock protecting the modification until the end of the transaction. Locks held by a transaction are released when the transaction completes (either commits or rollbacks).

Hierarchical locking is widely used in database indexes. Hierarchical locking lets large transactions take large (and thus few) locks and lets many small transactions proceed concurrently by taking small locks. The standard lock hierarchy for B-tree indexes starts by locking the table or view, then may lock the index or an index partition, and finally may lock a leaf page or individual key.

With the advent of disk drives approaching 1 Terabyte as well as very large databases and indexes, traditional hierarchical locking schemes begin to show flaws. For example, the current step from locking an index to locking its individual leaf pages or keys might prove too large. There may be millions of leaf pages and billions of keys in an index. Thus, if a lock on an entire index is too large and too restrictive for other transactions, thousands and maybe millions of individual locks are required. Conversely, if a transaction already holds 10,000 locks and then escalates to an index lock to save on computing resources, this index lock might inhibit hundreds of concurrent transactions. Current hierarchical locking schemes create a dilemma between locking an entire index and locking millions of individual leaf pages or keys.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments herein provide hierarchical locking techniques for B-tree indexes. In one embodiment, hierarchical lock modes are provided that permit locking a key, a gap between the key and the next key, and a combination of the key and the gap. In another embodiment, key range locking is performed via separator keys. In yet another embodiment, locks on key prefixes are used to provide key range locking.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

FIG. 13 is a block diagram showing the logic and operations of locking key prefixes in accordance with an embodiment of the invention.

FIG. 14 is a block diagram showing the logic and operations of locking key prefixes in accordance with an embodiment of the invention.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
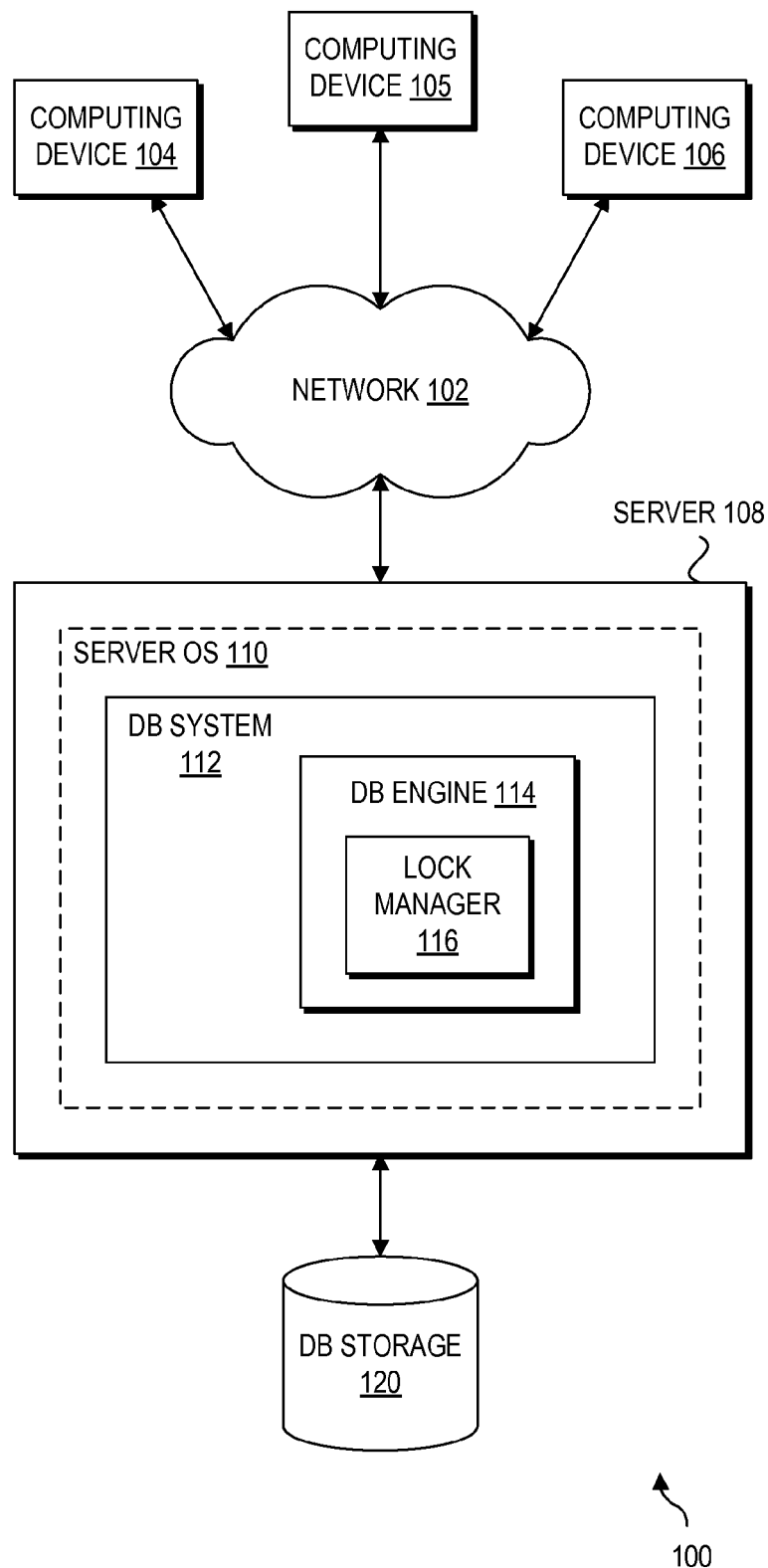
FIG. 1 is a block diagram of an example operating environment for implementing embodiments of the invention.

FIG. 1 shows an embodiment of an operating environment 100 for implementing embodiments of the invention. FIG. 1 and the following discussion are intended to provide a brief, general description of a suitable computing environment to implement embodiments of the invention. The operating environment 100 is only one example of a suitable operating environment and is not intended to suggest any limitation as to the scope of use or functionality of the operating environment.

Operating environment 100 includes a network 102. Network 102 may include an internet, an intranet, and the like. A server 108 may communicate with computing devices 104, 105, and 106 over network 102. An example computing device is described below in connection with FIG. 2. Computing devices 104-106 include client devices and/or servers that may access data in the database hosted by server 108.

Server 108 may include a server operating system (OS) 110. An embodiment of server OS 110 includes Microsoft Windows Server®. Server OS 110 may support a database (DB) system 112. An embodiment of database system 112 includes Microsoft SQL Server. A single server 108 is shown for the sake of clarity, but it will be understood operating environment 100 may include multiple servers 108.

Database system 112 may include a database engine 114. Database engine 114 is a service for storing, processing, and securing data. Database engine 114 provides access and transaction processing for data consumers. Database system 112 may include others services (not shown) such as analysis services, data mining tools, replication services, reporting services, notification services, and the like.

Server 108 may access a database storage 120 that stores data managed by database system 112. DB storage 120 may be external to server 108 (as shown in FIG. 1), internal to server 108, or a combination thereof. While a single DB storage 120 is shown for the sake of clarity, but it will be understood that multiple DB storage units 120 may be used. Further, DB storage 120 associated with database system 112 may be local to server 108, distributed across a network, or any combination thereof.

Database system 114 may include a lock manager 116. In one embodiment, when database engine 114 receives a transaction request, database engine 114 determines which resources are to be accessed. Database engine 114 determines what types of locks are required. Database engine 114 then requests the appropriate locks from lock manager 116. Lock manager 116 grants the locks if there are no conflicting locks held by other transactions. As described herein, data base engine 114 may use various hierarchical locking techniques. Database engine 114 may also perform other locking procedures, such as lock escalation/de-escalation and lock granularity changes, as described herein.

Figure 2:
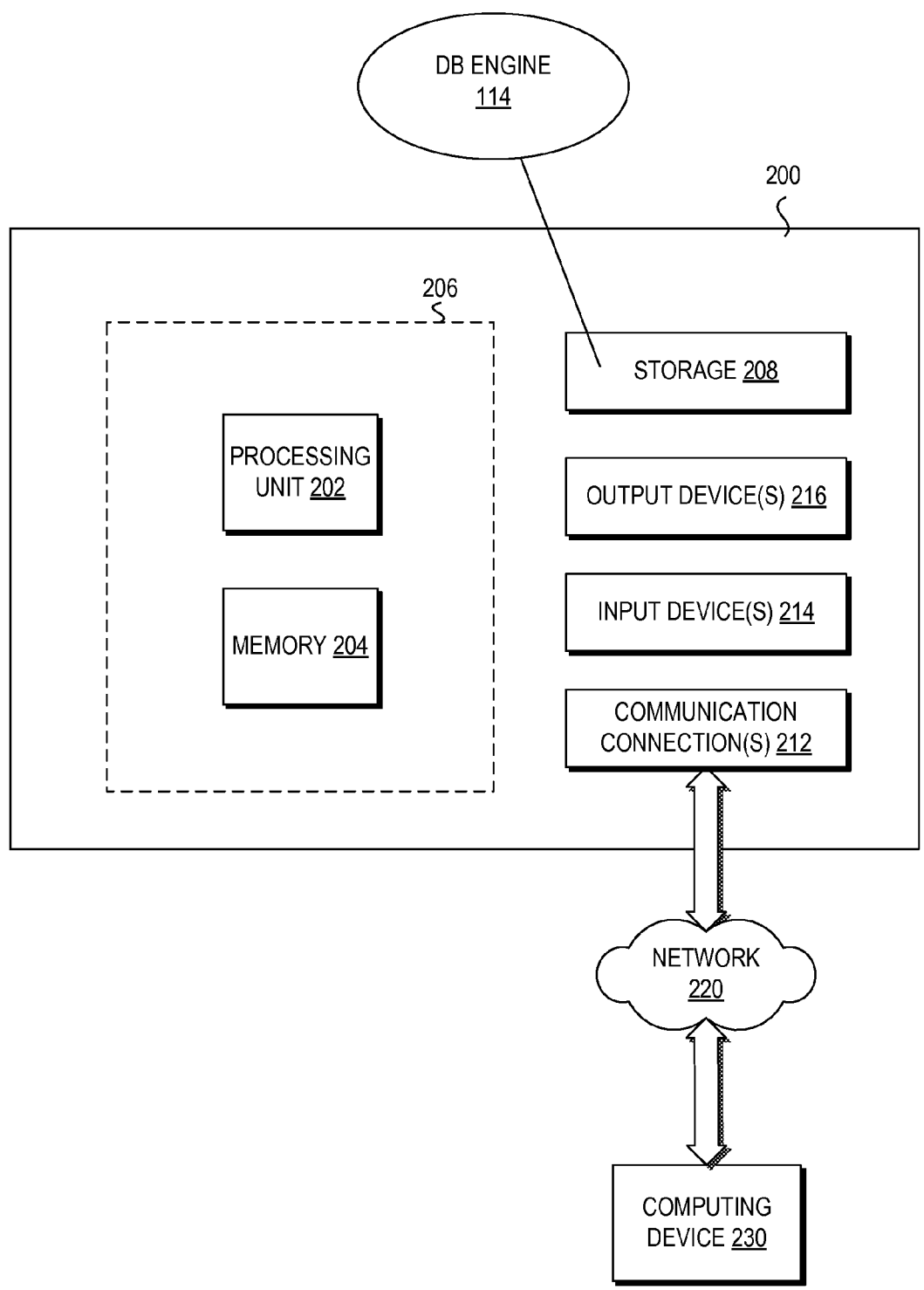
FIG. 2 is a block diagram of an example computing device for implementing embodiments of the invention.

FIG. 2 shows an embodiment of a computing device 200 for implementing one or more embodiments of the invention. In one embodiment, computing device 200 may be used as server 108. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

Additionally, device 200 may also have additional features and/or functionality. For example, device 200 may also include additional storage (e.g., removable and/or non-removable) including, but not limited to, magnetic or optical disks or tape. Such additional storage is illustrated in FIG. 2 by storage 208. In one embodiment, computer readable instructions to implement embodiments of the invention may be stored in storage 208, shown as DB engine 114. Storage 208 may also store other computer readable instructions to implement an operating system, an application program, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, application programming interfaces (APIs), data structures, and the like, that perform particular tasks or implement particular abstract data types. Typically, the functionality of the computer readable instructions may be combined or distributed as desired in various environments.

The term "computer readable media" as used herein includes computer storage media. Computer storage media includes volatile and nonvolatile, removable and non-removable media implemented in any method or technology for storage of information such as computer readable instructions, data structures, program modules, or other data. Memory 204 and storage 208 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 200. Any such computer storage media may be part of device 200.

The term "computer readable media" may include communication media. Device 200 may also include communication connection(s) 212 that allow the device 200 to communicate with other devices, such as with other computing devices through network 220. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 200 may also have input device(s) 214 such as keyboard, mouse, pen, voice input device, touch input device, laser range finder, infra-red cameras, video input devices, and/or any other input device. Output device(s) 216 such as one or more displays, speakers, printers, and/or any other output device may also be included.

Those skilled in the art will realize that storage devices utilized to store computer readable instructions may be distributed across a network. For example, a computing device 230 accessible via network 220 may store computer readable instructions to implement one or more embodiments of the invention. Computing device 200 may access computing device 230 and download a part or all of the computer readable instructions for execution. Alternatively, computing device 200 may download pieces of the computer readable instructions, as needed, or some instructions may be executed at computing device 200 and some at computing device 230. Those skilled in the art will also realize that all or a portion of the computer readable instructions may be carried out by a dedicated circuit, such as a Digital Signal Processor (DSP), programmable logic array, and the like.

1 Introduction to B-Trees

Figure 3:
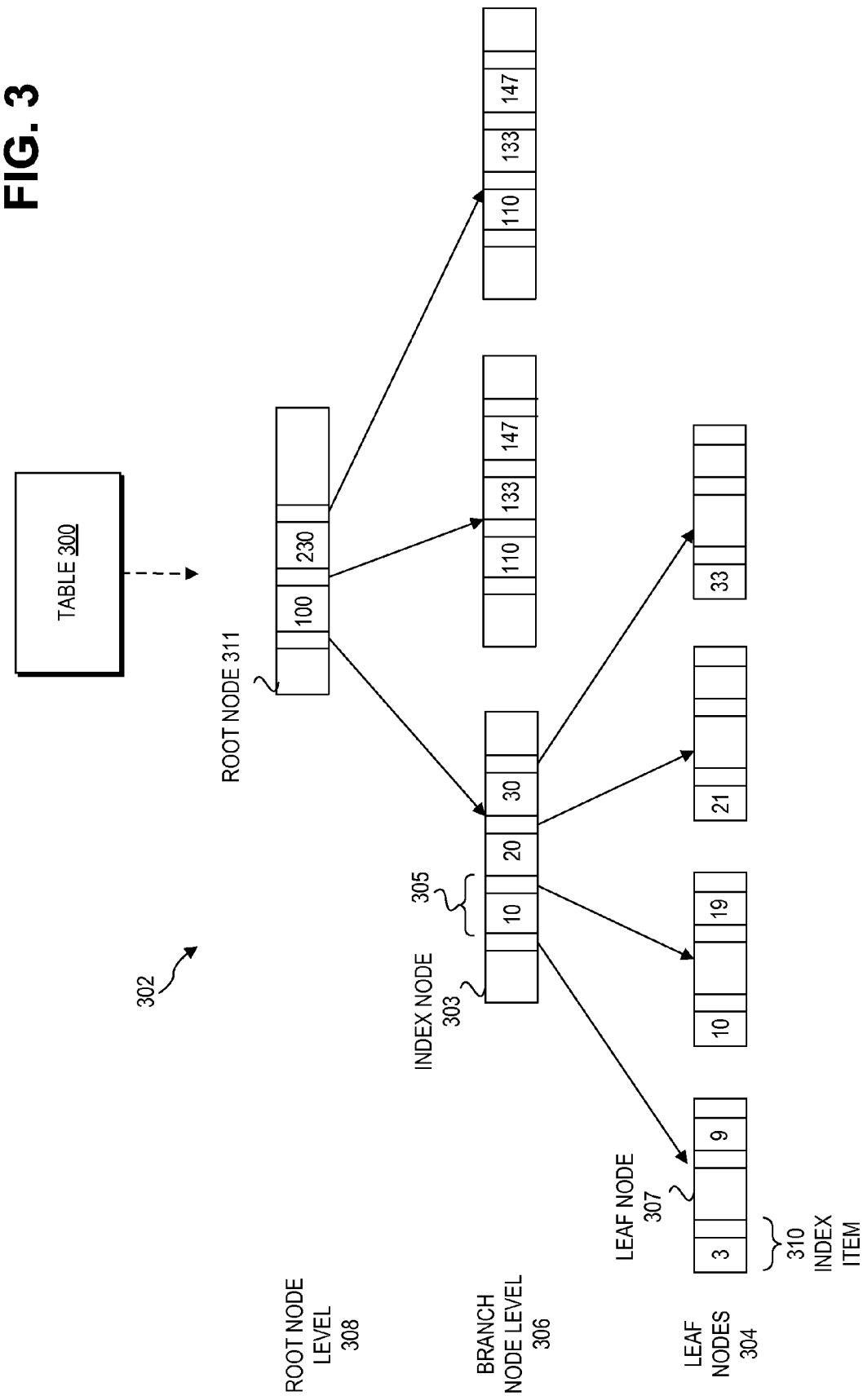
FIG. 3 is a block diagram of an example B-tree index structure in accordance with an embodiment of the invention.

Embodiments of the invention provide locking mechanisms for B-tree indexes. An example B-tree index 302 is shown in FIG. 3. Table 300 is a database object that organizes data in columns and rows. Each row represents a unique record, and each column represents a field within the record. For example, a table of contact addresses may include a row for each person and columns for first name, last name, street address, city, state, and zip code.

B-tree index 302 is an index structure associated with table 300. B-tree index 302 has keys associated with one or more columns in table 300. The keys are stored in the B-tree index 302 in such a way to enable the data base system to quickly find the row or rows using particular key values.

B-tree 302 includes three-levels: a root node level 308, a branch node level 306, and leaf node level 304. A root node 311 includes pointers to branch nodes. A branch node includes pointers to leaf nodes or other branch nodes. FIG. 3 shows one branch node level for the sake of clarity, but it will be understood B-tree indexes may include multiple branch node levels and thus more than three levels total. In other embodiments, a B-tree may include less than three levels (for example, in the case where a single page is sufficient for a root index and leaves).

Index nodes, such as root nodes and branch nodes, include key-pointer pairs. For example, index node 303 includes key-pointer pair 305. Usually, an index node includes a sorted sequence of keys (and their associated pointers) that divides the search space covered by the index node. An index node may contain no actual data, but hold index information to guide a search for a given key value. The key-pointer pair 305 may be called a separator key because it separates key values at index node 303 into two nodes (leaf nodes in this example).

A leaf node, such as leaf node 307, includes index items and may also include pointers to neighboring leaf nodes. Leaf nodes may include one or more index items, such as index item 310, which contain a key and row information. The key represents the value of the indexed column for a particular row in table 300. The row information may include the actual data for the row in table 300 or a pointer to such data (i.e., a clustered index or an non-clustered index).

Embodiments of the invention may include aspects of B-tree indexing as follows. Embodiments herein may employ user transaction and/or system transactions. A user transaction includes a database access request initiated by a user (for example, a human or a computing process). System transactions may modify the database representation but not its contents and therefore permit certain optimizations such as commit without forcing the transaction log.

In one embodiment, a system transaction may be used to remove ghost records left behind after deletions by user transactions. Separation of logical deletion (turning a record into a ghost) and physical deletion (reclaiming the record's space) serve various purposes such as simplified rollback for the user transaction if required, increased concurrency during the user transaction (locking a single key value rather than a range), and reduced overall log volume. If the ghost removal can capture record deletion and transaction commit in a single log record, there is never any need to log undo information (that is, the deleted record's non-key contents).

Embodiments herein include lock escalation and de-escalation. Lock escalation and de-escalation are useful due to unpredictable concurrency contention and due to inaccuracy of cardinality estimation during query optimization. Lock escalation reduces overhead for queries with unexpectedly large results. It saves both invocations of the lock manager and memory for managing the locks.

Lock de-escalation reduces contention. In one embodiment, lock de-escalation requires that each transaction retain, in transaction-private memory, the information required to obtain the appropriate fine-grain locks. For example, even if a transaction holds a shared lock on an entire index, it must retain information about the leaf pages read as long as de-escalation to page locking might become desirable or required.

Initial large locks combined with on-demand lock de-escalation can improve performance, because detail locks can be acquired without fear of conflict and thus without search in the lock manager's hash table.

In some embodiments, for large index-order B-tree scans, the parent and grandparent nodes enable deep read-ahead. Thus, accessing those nodes and their separator keys does not incur any extra I/O, and it is conceivable to lock those nodes or separator keys if desired.

In some embodiments, nodes may include fence keys. Each node split posts a separator key in the parent node, but also retains a copy of the separator key (the fence key) in the two sibling nodes resulting from the split. Such fence keys aid B-tree operations in multiple operations including key range locking and de-fragmentation.

In embodiments of the invention, all B-tree entries are unique. It is not required that the declared search keys are unique; however, the entries must have identifying information such that a row deletion leads to deletion of the correct B-tree entry. Standard mechanisms for this purpose are to add the row pointer in the sort order of non-clustered indexes and to add "uniquifier" numbers to clustered index keys.

2 New Lock Modes for Keys and Key Ranges

Embodiments of the invention include new lock modes for key range locking in B-tree indexes. In key range locking, a key-range lock is placed on an index entry specifying a beginning or ending key value. The key-range lock may block attempts to insert, update, or delete any row with a key value that falls in the range because those operations would first have to acquire a lock on the index. Embodiments of new lock modes discussed below provide a simplification for traditional key range locking, avoid irregular complexities such as instant locks and insert locks, and increase permitted concurrency when applied to keys in B-tree leaves.

Figure 4:
FIG. 4 shows a traditional lock compatibility matrix.

FIG. 4 shows a traditional lock compatibility matrix 400. The columns show the existing granted lock mode on a resource and the rows show the requested lock mode. The lock modes include shared (S), exclusive (X), intent shared (IS), and intent exclusive (IX). A shared lock mode may be used for operations, such as read, that do not change data. An exclusive lock mode may be used for data-modification operations.

An intent lock mode may be used to establish a lock hierarchy. In general, intent locks (also referred to as intention locks) are acquired before a lock at a lower level in the locking hierarchy to signal the intent to place locks at the lower level. Typical intent locks include intent shared (IS), intent exclusive (IX), and shared with intent exclusive (SIX). Intent locks prevent other transactions from locking the higher-level resource in a way that would contradict the lock at the lower level.

Compatibility matrix 400 shows whether two locks may co-exist on the same resource, such as a key. For example, two shared locks may co-exist (shown by a Yes (Y) at the row-column intersection of the S locks in matrix 400). In another example, X and S locks may not co-exist (shown by a No (N) at the row-column intersections of the S and X in matrix 400). X and S lock modes are not compatible because when an X lock is held, no other transaction may acquire a lock of any kind on that resource until the X lock is released. Using the lock modes in matrix 400, the key value, the gap between keys, and the combination of key value and gap are three separate resources that are locked using different locks and thus separate invocations of the lock manager.

Figure 5:
FIG. 5 shows a lock compatibility matrix in accordance with an embodiment of the invention.

Referring to FIG. 5, an embodiment of a lock compatibility matrix 500 including new lock modes is shown. Embodiments of new lock modes described herein take advantage of the fact that the key value serves as identifier for all three resources (i.e., key, gap, and key-gap combination) in the lock manager's hash table, which permits employing only one resource and one invocation of the lock manager at the expense of additional lock modes.

The new lock modes shown in matrix 500 permit locking a key and the gap between two keys separately. For the purpose of discussion herein, the "implied" intent locks (discussed below) apply to the combination of key and gap between keys. The absolute locks can apply to the key, the gap between keys, or their combination.

The new lock modes may be thought of as having a key component and a gap component, where the gap represents the gap between two key values not including the key values marking the ends of the gap. Matrix 500 introduces the symbol "Ø" which represents a null on either the key component or the gap component of the lock mode. The new lock modes include key shared (SØ), gap shared (ØS), key exclusive (XØ), gap exclusive (ØX), key shared gap exclusive (SX), key exclusive gap shared (XS).

For example, assume a key range based on last names of "Albertson" to "Connor." An SØ lock on "Albertson" would put a shared lock on "Albertson" and no lock on the gap between "Albertson" and "Connor" excluding "Albertson" and "Connor." An SX lock on "Albertson" would put a shared lock on "Albertson" and an exclusive lock on the gap between "Albertson" and "Connor" excluding "Albertson" and "Connor."

These new lock modes are identified by a key value, but they represent locks on the key value itself, the gap between key values, and the combination of the key value and gap. For example, the new lock mode SØ locks the combination of key and gap in IS mode, the key in S mode, and the gap not at all. Conversely, ØS puts a shared lock on the open interval ($K_i$, $K_{i+1}$) and leaves the key value unlocked (where K is a key value).

The new lock mode XØ locks the key exclusively and the gap not all. Conversely, ØX does not lock the key, but locks the gap exclusively. Lock mode SX locks the key and gap combination in IX mode, the key in S mode, and the gap in X mode. Lock mode XS locks the key exclusively, the gap in shared mode, and the combination of key and gap in IS mode.

It will be noted that intention locks are not part of the names for the new lock modes but intention locks are implied. The new lock modes are identified by a key value, but they represent locks on the key value itself, the gap between key values, and the combination of the key value and the gap. IS and IX lock modes are not shown because they do not apply to key values in this scheme other than implied by the new lock modes. The combination of the locking the key and the gap in a single lock may act as an intention lock (for example, IS or IX). Also, one should avoid any confusion with combination lock modes, such as SIX, which represents two locks on the same resource.

The derivations of the compatibility values in matrix 500 follow directly from the construction of the lock modes themselves. For example, SØ and ØX are compatible because both take intention locks for the combination of key value and gap, and one transaction locks the key value in S mode whereas the other transaction locks the gap in X mode. Similarly, XØ and ØX are compatible, as are SØ and SX.

2.1 Insertion of a New Key

Insertion of a new key (and associated record) may be implemented as a system transaction. The system transaction invoked for key insertion leaves behind a ghost record that the user transaction can lock in key value mode and then turn into a valid record to effect the logical insertion. This is analogous to key deletion implemented by turning valid B-tree records into ghost records with asynchronous ghost removal using system transactions.

The system transaction places a lock on the gap for inserting the new key (e.g., by placing an ØX lock on a pre-existing key next to the gap). The value of the system transaction for key insertion is that it releases its lock on the gap between pre-existing keys when it commits. The follow on user transaction inherits a lock only on the new key value, not on the gap (that is, an XØ lock on the new key). By holding this XØ lock until it commits, the user transaction can modify the record from a ghost to a valid record. In the case of a rollback, the ghost record remains and may be removed like other ghost records (for example, upon request by a future user transaction that requires more space in the B-tree leaf).

Figure 5B:
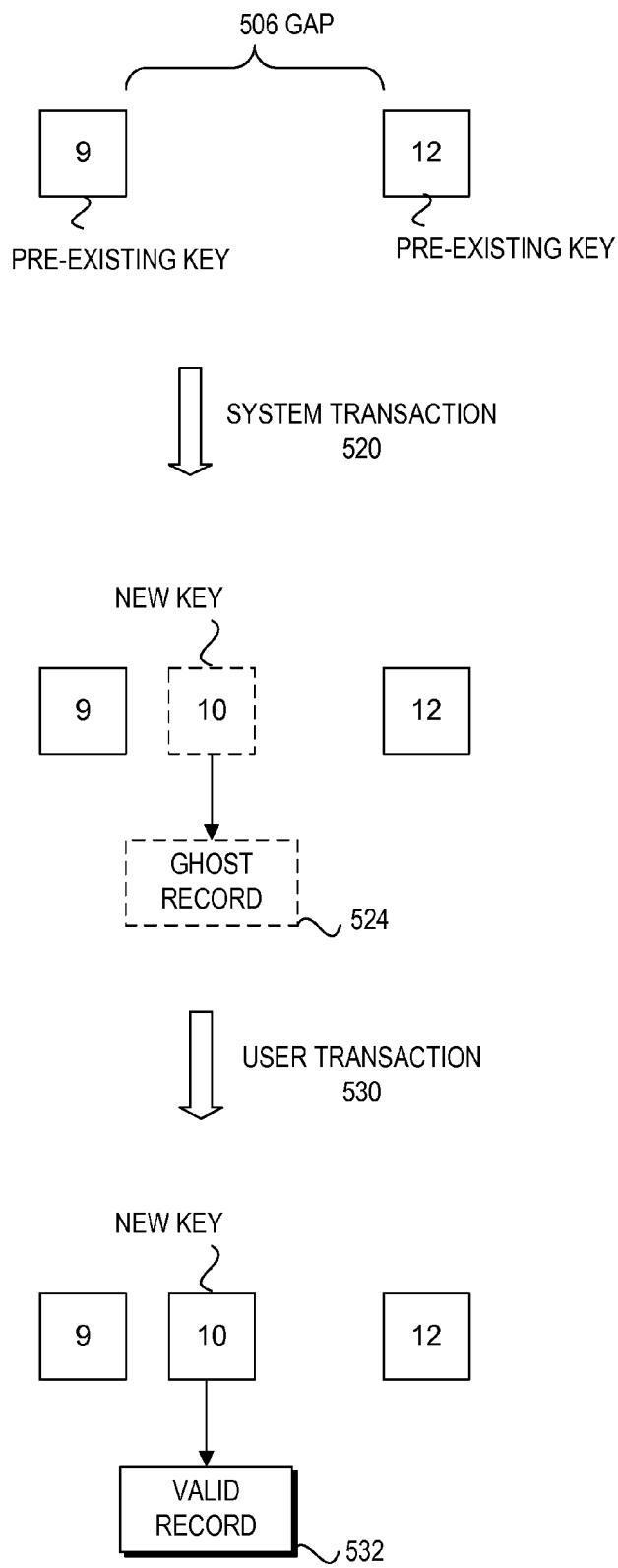
FIG. 5B is a block diagram showing the logic and operations of inserting a new key using new lock modes in accordance with an embodiment of the invention.

For example, turning to FIG. 5B, a gap 506 is shown between pre-existing keys 9 and 12 (it will be understood that gap 506 is a logical gap, and not a physical gap between the pre-existing keys). Also, pre-existing keys 9 and 12 have associated records that are not shown for clarity.

To insert a new key 10 between pre-existing keys 9 and 12, a system transaction 520 places an ØX lock on key 9 to lock the gap between keys 9 and 12. System transaction 520 inserts new key 10 (and associated ghost record 524) in gap 506. User transaction 530 inherits an XØ lock on new key 10 and then converts the ghost record to a valid record 532 to complete the insertion. It will be understood that a lock may be placed on new key 10 and its associated ghost record.

In the meantime, another user transaction or a system transaction may lock the gap defined by the new key. Using an ØX lock on the new key (which really locks the gap defined by the new key), this other transaction may insert yet another key into the gap defined by the pre-existing key. Thus, embodiments herein support high insertion rates within a page and an index without any need to introduce irregular complexities such as instant locks and range locks that do not fit the traditional theories of two-phase locking and of hierarchical locking.

Moreover, the system transaction locks only the gap into which it inserts the new key; it has no need to lock the pre-existing key value that identifies the gap. Thus, another transaction can concurrently read the record with the pre-existing key. In FIG. 5B, another transaction can read the record associated with pre-existing key 9 concurrent with the insertion of new key 10. It can update and even delete the record with pre-existing key 9 if deletion is implemented by turning the valid record into a ghost record. Neither concurrent reading nor concurrent updates is possible in locking schemes without locks on the open interval between keys (for example, traditional key range locking). The system transaction of inserting a new key into a gap is compatible with any of these actions on the pre-existing key as long as the key is not erased from the B-tree. Thus, interference among neighboring keys is minimized by use of ghost records and system transactions. One skilled in the art having the benefit of this description will understand that the new lock modes may also be used for deletion of a key and associated record (e.g., turn a valid record into a ghost record and then reclaim the ghost record space).

A system transaction may be very efficient; a single log record may cover transaction start, key insertion, and transaction commit. In workloads that append many B-tree keys with predictable keys (for example, order number in an order-entry application), a system transaction may create multiple ghost records such that multiple user transactions each can find an appropriate ghost record that merely needs updating, without creating a new record or a new lockable resource.

3 Locks On Separator Keys

Embodiments of key range locking on separator keys exploits the tree structure of the B-tree for multi-level hierarchical locking. Separator key range locking may be used in interior index nodes (e.g., branch nodes and root nodes). A lock on a separator key represents the entire key range from one separator key to its next neighbor but not including the neighbor. Both intention locks and absolute locks can be employed on separator keys as well as combinations (e.g., SIX).

Figure 6:
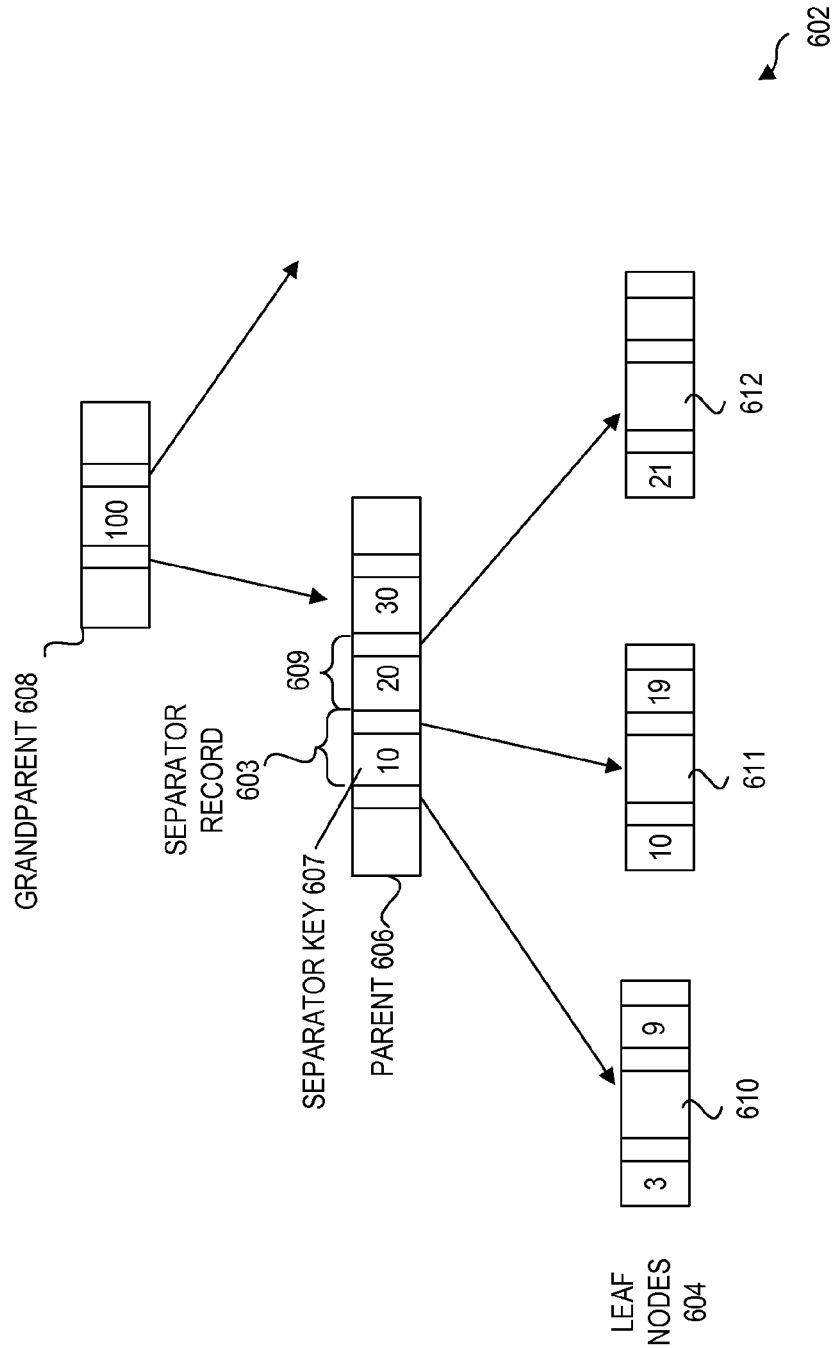
FIG. 6 is a block diagram showing the logic and operations of locking separator keys in accordance with an embodiment of the invention.

FIG. 6 shows a portion of an example B-tree 602. B-tree 602 includes a grandparent index node 608, a parent index node 606, and leaf level 604 having leaf nodes 610-612, where the parent and grandparent levels are in reference to leaf level 604. A separator record 603 includes a separator key 607 and associated pointer. Separator record 603 makes a separation between two leaf nodes 610 and 611. As described below, locking separator key 607 would have the similar affect as putting a range lock on the entire leaf node 611. The lock on separator key 607 locks the key range up to the next separator record 609.

Locking key ranges at the parent level results in locking overheard and concurrency behavior similar to traditional locking on leaf pages. A key range lock at the grandparent level, however, covers a much larger key range. Depending on a node's fan-out, a range lock at the grandparent level may save tens or hundreds of locks at the parent level, just like a key range lock in a parent node covers tens or hundreds of individual keys.

Traditional lock modes may be applied to separator keys and cover the half-open range from the locked separator key (inclusively) to the next separator key (exclusively). For the highest key value in a node, a fence key may be used to delimit the range protected by the range lock. A fence key includes a copy of the separator key in the node's parent. For the lowest key range (i.e., the node's "left-most" child), the fence key is required as it determines the key value to lock. Many systems retain the lowest separator key even if the systems do not employ fence keys in general.

Locks on separator keys in parents are identified by the index identifier, the key value, and the node level within the B-tree. Node levels are commonly stored in each node's page header, with level 0 assigned to leaves. The node level one up from the leaf level (i.e., the parent node) is node level 1 and so on.

Note that this identification of locks does not refer to a physical location (for example, a page identifier) but a logical location in the B-tree. Thus, locks remain valid even if a separator key migrates into a new node when a node splits, when two nodes merge, or when two neighboring nodes balance their load.

3.1 Splitting and Merging Nodes

A node split may occur when a new row is inserted into a leaf page that already has reached its maximum number of entries. In one embodiment, the leaf page is split into two leaf pages and the entries from the original leaf page are distributed evenly between the two new leaf pages. A separator key between the two new leaf pages is pushed up to the index node that holds the pointer to the split leaf page.

Figure 7:
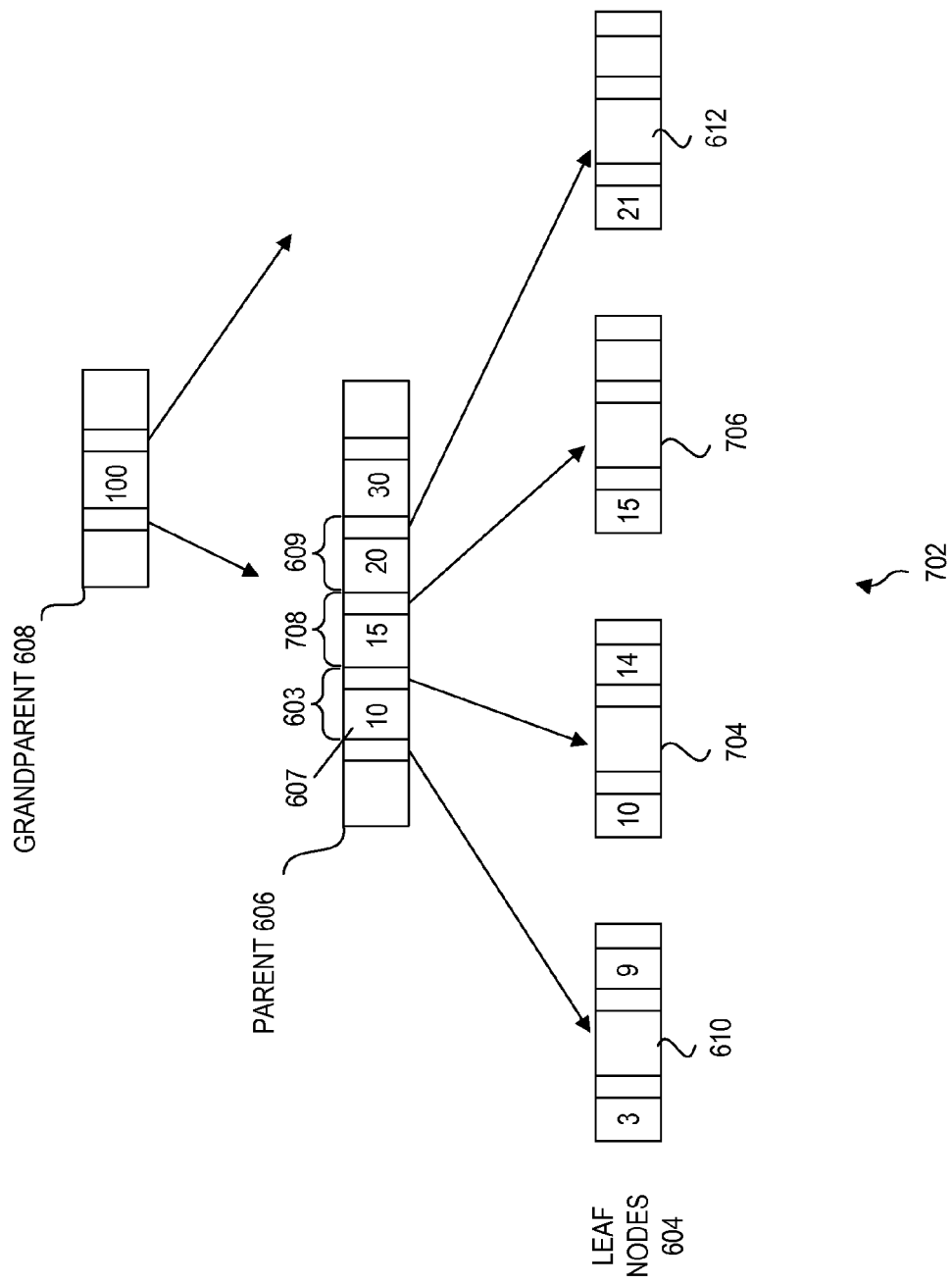
FIG. 7 is a block diagram showing the logic and operations of locking separator keys in accordance with an embodiment of the invention.

An example of splitting is shown in FIG. 7. B-tree 702 results from the splitting of leaf 611 in B-tree 602 of FIG. 6. Key value 14 was to be inserted into leaf 611, but since leaf 611 was full, leaf 611 was split into leaves 704 and 706. As a result, a new separator record 708 was added to parent index node 606.

Two leaf nodes may merge when the number of entries in a leaf page falls below a threshold (for example, 50% of maximum). The index items are copied from one leaf node to another and the separator record in the parent node is removed.

When a node splits, a new separator key is inserted in its parent. This new separator key divides a prior gap between two neighboring separator keys and thus disturbs existing locks covering this range. In order to ensure that existing transactions are not materially affected, their locks on the range are duplicated and applied to the new separator key. This procedure permits page splits at all levels without interrupting the flow of transaction processing. Also, this procedure ensures that no transaction's locked predicate is modified due to a change in the physical B-tree structure. Referring to the splitting in FIG. 7, the locks on separator key 607 have been duplicated and are applied to the new separator key "15" in separator record 708 to maintain the locks over the same key ranges.

When two nodes merge, the opposite procedure applies. As ranges merge with the removal of a separator key, transactions end up holding locks on the entire range, as if they had locked both original ranges equally. In this case, the lock manager verifies that the combined set of locks does not include conflicts. For example, assume an S lock on one original range and an IX lock in the other original range. In this example, the node merge operation is delayed because the S and IX locks are not compatible (refer to FIG. 4). The merge operation will be delayed until one of the locks is released and, thus, the conflict is eliminated.

Embodiments of locking on separator keys may include load balancing between neighboring nodes. In one design, load balancing among two neighboring nodes may be accurate in its locking but fairly complex due to the shift in key ranges between neighboring nodes. In this case, the load balancing logic determines the locks needed on the parents from locks held on the child node entries that migrate.

In another design, load balancing may be made simple. The simple method models load balancing as a merge operation followed by a split operation. In other words, the neighboring nodes are merged and then split back into two nodes having substantially equal entries. However, the locking may not be as accurate.

3.2 Lock Escalation and De-Escalation

Lock escalation converts many fine-grain locks into fewer coarse grain locks. De-escalation performs the inverse operations. Lock escalation reduces system overhead due to managing fewer locks while increasing the probability of lock conflicts. Escalation upgrades a lock from an intention lock to an absolute lock. Many fine-grain locks resulting from de-escalation reduce the odds of concurrency contention but increase lock management due to the increase in the number of locks. De-escalation downgrades a lock from an absolute lock to an intention lock.

Embodiments of locks on separator keys may include lock escalation and de-escalation functionality. Locking within a B-tree may start with key locking in the leaves' parents or it may start at the grandparent level in order to cover larger key ranges and thus require fewer locks in large range scans.

If range locking starts with intention locks on separator keys at the grandparent level (for example, IS locks) and continues with absolute locks on separator keys at the parent level (for example, S locks), both lock escalation (for example, lock escalation to absolute locks in the grandparents) and de-escalation (for example, lock de-escalation to intention locks in the parents and absolute locks in the leaves) may be required.

Figure 8:
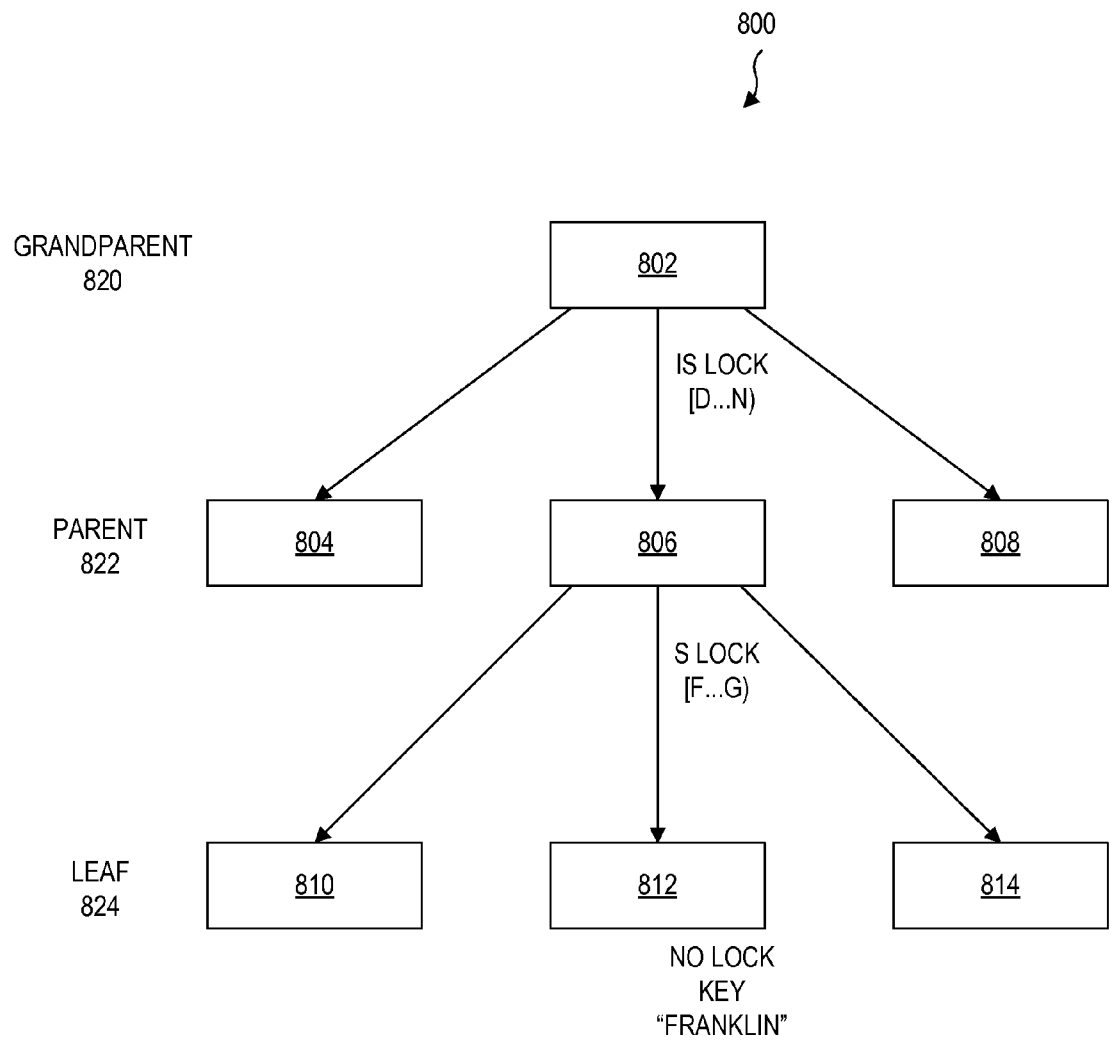
FIG. 8 is a block diagram showing the logic and operations of locking separator keys in accordance with an embodiment of the invention.

Referring to FIG. 8, a B-tree 800 is shown having a grandparent level 820, a parent level 822, and a leaf level 824. In the example of FIG. 8, B-tree 800 is indexed based on last name. Assume that B-tree 800 has intention locks (IS or IX) on key ranges in grandparent node 802, absolute locks (S or X) on key ranges in parent node 806, and no locks on keys in leaf nodes 810, 812, and 814. In an example shown in FIG. 8, node 802 has on IS lock on the half-open key range interval [D . . . N) in node 802. Node 806 has an S lock on the half-open key range interval [F . . . G) in node 806. Node 812 has no lock on the key "Franklin" in node 812.

Figure 9:
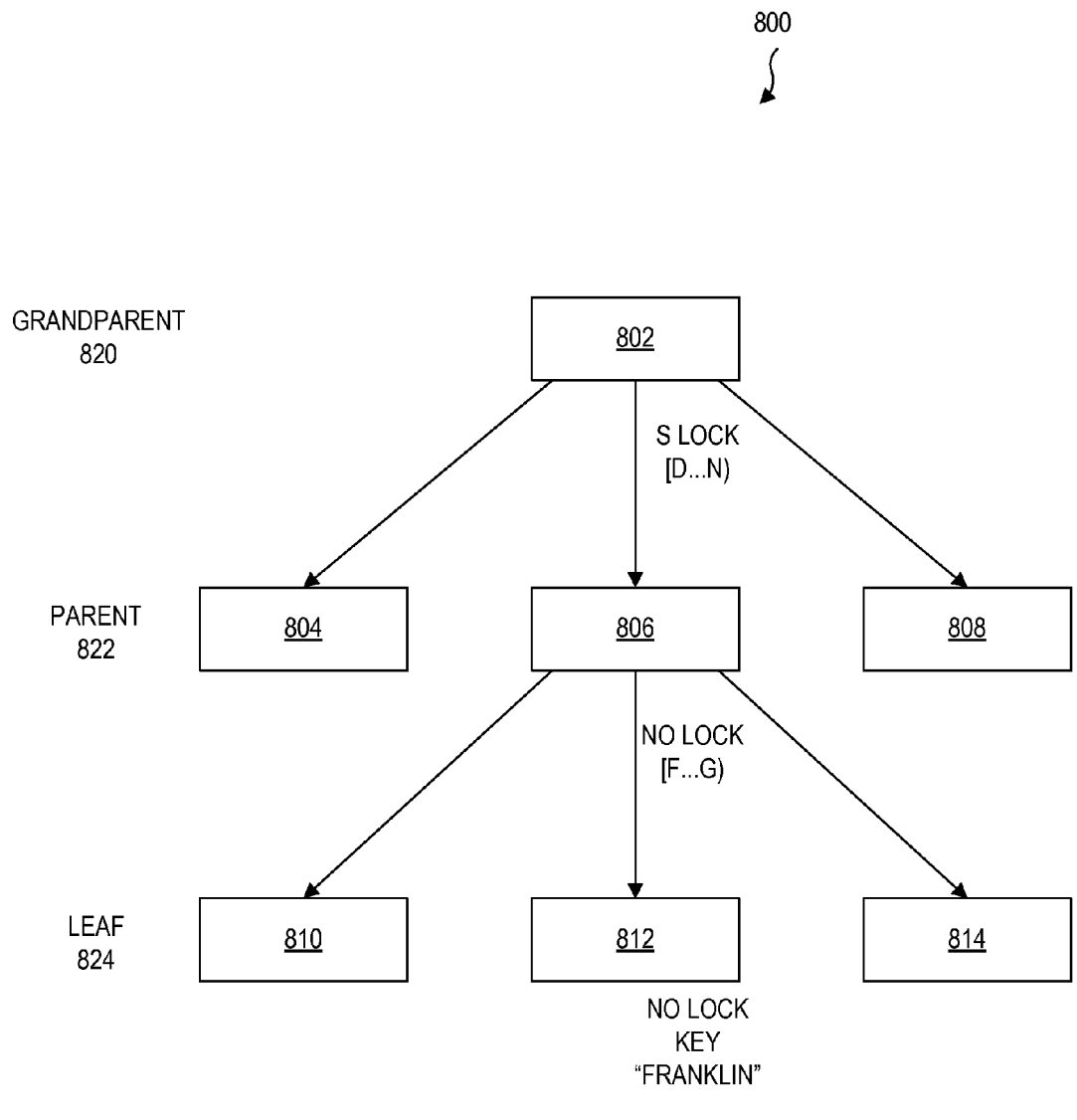
FIG. 9 is a block diagram showing the logic and operations of locking separator keys in accordance with an embodiment of the invention.

Referring to FIG. 9, for lock escalation, the intention lock at grandparent node 802 becomes an absolute lock (an S lock in the example of FIG. 9). The only remaining locks will be absolute locks (S or X) on key ranges in grandparent node 802. The locks at parent level 822 now become obsolete due to the absolute lock at grandparent level 820 and may be eliminated. In one embodiment, the locks at parent level 822 may be erased. In another embodiment, the locks at parent level 822 may be retained in the lock manager or in transaction-private memory for future lock de-escalation, which may be desired due to increasing contention or due to a partial transaction rollback.

Figure 10:
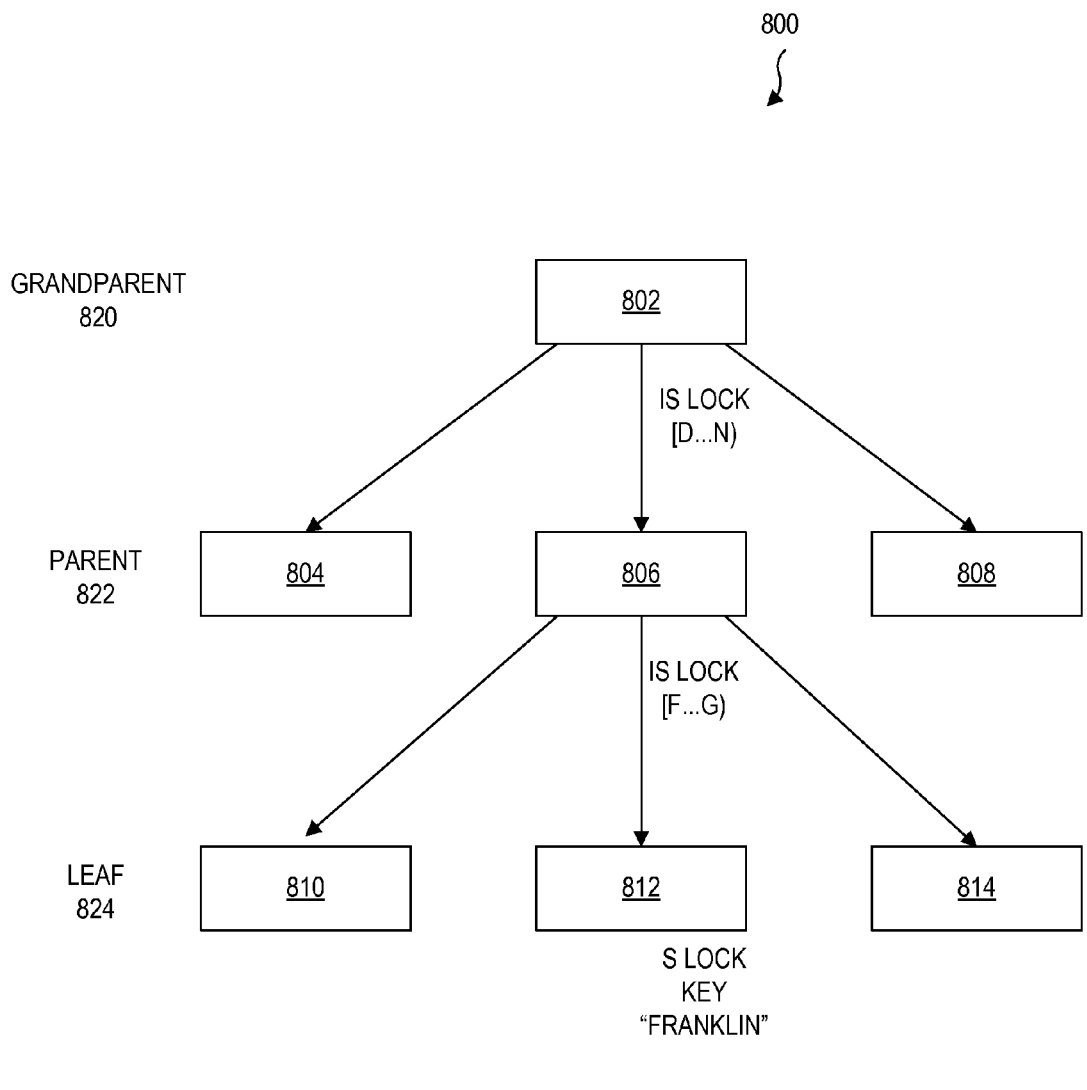
FIG. 10 is a block diagram showing the logic and operations of locking separator keys in accordance with an embodiment of the invention.

In the example shown in FIG. 9, in node 802, the open-interval IS lock has escalated to an S lock on key range [D . . . N). Thus, no locks are necessary on key range [F . . . G) at node 806 and key "Franklin" in node 812. Referring to FIG. 10, for lock de-escalation of the locks in FIG. 8, the absolute locks at parent level 822 become intention locks. In FIG. 10, intention locks will be maintained in grandparent node 802. The absolute locks on parent node 806 become intention locks and absolute locks will be placed in the leaves 810, 812, and 814. In the example shown in FIG. 10, the S lock on key range [F . . . G) is de-escalated to an IS lock and an S lock is placed on the key "Franklin" of node 812.

In one embodiment, this de-escalation includes proactive gathering of required leaf-level key locks during initial processing before the de-escalation actually occurs. These pre-gathered leaf-level locks may be stored in transaction-private memory. During de-escalation, after these leaf-level locks have been propagated from transaction-private memory to the global lock manager's hash table, the absolute lock on the separator key in the parent can be relaxed to an intention lock.

In one embodiment, partial transaction rollback will not reverse this de-escalation because reversal requires upgrading a lock, which might fail due to locks held by concurrent transactions. In fact, after lock de-escalation due to contention by concurrent transactions, it is likely that such a lock upgrade (from an intention lock to an absolute lock in the parent nodes) during partial transaction rollback will fail.

3.3 Granularity Changes

Existing designs for hierarchical locking employ a fixed set of levels at which locks are required. For example, a hierarchy of physical containers might be database, file, page, and record. A hierarchy of logical containers within a database might be table, index, index partition, and key. Within each such hierarchy, a transaction may request a lock at a lower granularity of locking (e.g., a page) only after acquisition of an appropriate intention lock on the next-higher granularity of locking (e.g., the file containing the desired page).

Embodiments herein use granularity changes to adjust the set of levels in a hierarchy. For example, embodiments herein permit removing a granularity of locking from a hierarchy, such as a change from table-index-index partition-key to table-index-key. Inversely, embodiments herein permit introducing a new granularity of locking into a hierarchy, e.g., from table-index-key to table-index-index partition-key. Embodiments herein permit such changes while transactions are active (i.e., dynamically), including transactions that hold or desire locks on the granularity of locking being removed or being introduced.

Embodiments herein may include granularity changes of separator key locks. A granularity change involves a change in the set of B-tree nodes where ranges are locked. In embodiments herein, a node may be marked for locking to lock the node's key ranges or a mark on a node may be removed to remove the lock on the node's key ranges.

As a comparison, lock escalation and de-escalation involve changing locks in a particular B-tree node between an intention mode and an absolute mode. In examples of lock escalation/de-escalation above, acquisition of the first locks occurred in the leaves' grandparents. This starting point may be adjusted dynamically and online (that is, without disruption of transaction processing) using granularity changes.

Figure 11:
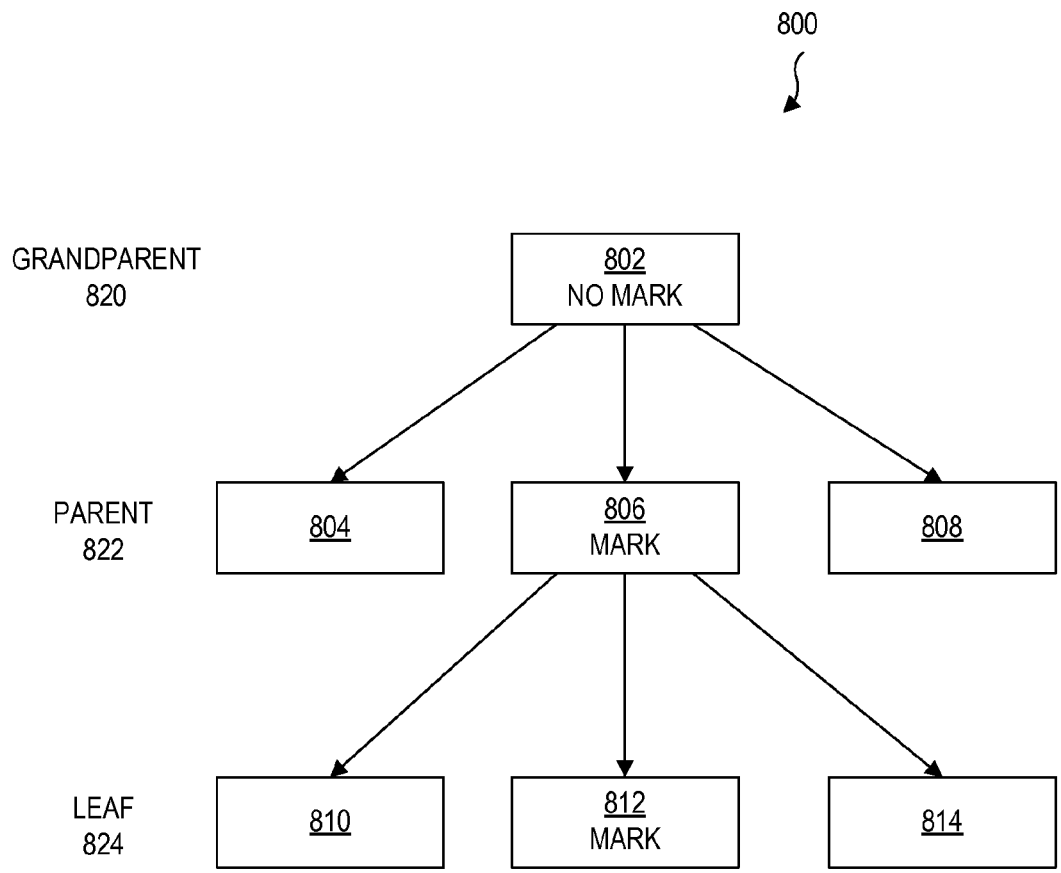
FIG. 11 is a block diagram showing the logic and operations of locking separator keys in accordance with an embodiment of the invention.

In FIG. 11, grandparent node 802 is not marked for locking and no locks are taken on separator keys in node 802. Parent node 806 is marked such that key range locks are taken on separator keys in parent node 806. Leaf node 812 is also marked for locking. The other nodes in FIG. 11 have been set as mark or no mark, but this is not shown for the sake of clarity. In one embodiment, a node includes a Boolean mark/no mark field.

Setting a mark on a node signals that a lock request is required to the lock manager for at least one separator key in the node (along with the search path from the root node to the sought leaf node entry). It is emphasized that nodes are marked, but locks are placed on one or more keys within a marked node.

Setting a mark on a node (for example, setting a mark on grandparent node 802) may be either immediate or delayed. An advantage of the immediate method is that a transaction may request lock escalation even to a node in which no transaction has acquired locks. However, the delayed mode takes substantially less search in the lock manager's hash table than the immediate method.

In one embodiment, the immediate method searches in the lock manager's hash table for active transactions that ought to hold intention locks. These transactions can be found by searching for locks on separator keys in the node's children (for example, nodes 804, 806, and 808 that are children to node 802). For all such transactions, appropriate intention locks for the appropriate separator keys in the present node are inserted into the lock manager. Thus, intention locks may be set on separator keys in node 802 where the separator key points to a child node that already has separator key locks.

While the search for such transactions is time expensive, acquisition of the new intention locks is very fast as there is no need to search for conflicting locks. The correctness of the immediate method relies on its correct acquisition of all intention locks that would have been held already if the mark had been set on the node before any of the active transaction began.

In one embodiment, the delayed method forces all new transactions to acquire intention locks and prevents acquisition of absolute locks in the node until all older transactions have completed. To do so, the delayed method employs two system transactions. The first system transaction marks the node for locking, thus forcing all future transactions to acquire intention locks when descending the B-tree. In FIG. 11, node 802 is marked for locking. A second concurrent system transaction obtains IX locks on all separator keys in the node (for example, node 802), observes the set of currently active transactions, waits until the last one of those has finished, and then commits the IX locks. For the duration of these IX locks, no transactions may acquire an absolute lock on keys in the child nodes (recall from FIG. 4 that IX locks are incompatible with S and X locks). The correctness of the delayed method relies on a system transaction holding IX locks on all keys on behalf of all active transactions, whether those transactions actually require them or not.

When a non-leaf mode is split (for example, grandparent node 802 or parent node 806), both resulting nodes inherit the mark from the original node. A split operation can proceed even while a granularity change is on-going, whether the immediate or delayed method is employed.

For two nodes to merge, they must be marked equally first, that is, a modification in the granularity of locking might be needed prior to a node merge operation.

Removing a node's mark (for example, removing the mark on node 806 in FIG. 8), follows a procedure similar to the delayed method above. One system transaction erases the mark so that future transactions do not acquire locks, while another system transaction obtains IX locks on all keys in the node (waiting for other transactions to release their absolute locks, if any, on those keys) and then commits.

Embodiments of granularity changing may occur dynamically. In other words, the introduction and removal of levels in a lock hierarchy may occur on demand by the database engine and without disrupting transaction processing. These dynamic changes may be exploited in many ways. For example, assume in order to maximize transaction processing performance, only keys in leaf nodes are locked by default. However, if the database engine determines that a transaction would benefit from a larger granularity of locking (for example, locking the key range of an entire leaf page instead of numerous individual locks in the leaf page), then key range locking can be introduced specifically in those parents and grandparents that benefit the transaction. When no longer advantageous, the granularity of locking may be adjusted as appropriate to continually maximize transaction processing performance.

Both setting and removing a node's mark are local operations that hardly affect data availability. Note that new user transactions can lock keys in a node while a system transaction holds IX locks; these IX locks do not conflict with other intention locks, only with absolute locks.

The set of nodes marked for locks on separator keys has few restrictions. For example, it is possible that a node is marked but some of its siblings are not, or that a leaf's parent is not marked but its grandparent is (skip-level locking). These examples may seem counter-intuitive, but they might be appropriate intermediate states while an entire B-tree is converted to a different granularity of locking, or they might be permanent states tuned for skew in the data distribution or in the access pattern.

In one embodiment, policies may be used to govern granularity changes. For transaction processing systems, an initial policy might start with locking keys in the leaves only and locking separator keys in the upper B-tree nodes only inasmuch as necessary for lock escalation. In other words, non-leaf nodes are marked as described above only on demand. Similarly, marks are removed after their benefit ceases, that is, nodes remain marked only during demand. For relational data warehousing, locks in parent and grandparent nodes seem like a reasonable default, depending on the amount of incremental online information flow from business processes.

Embodiments herein may lock separator keys in non-leaf B-tree nodes. Locking separator keys scales with the size and the height of the B-tree index. The stepping factor is fairly uniform across all levels of the index, even in an index with a non-uniform key value distribution. Typical values for the stepping factor may be 100 to 1,000; the latter value requiring large pages or very short keys (for example, due to aggressive prefix or suffix truncation). Thus, the database administrator or the automatic tuning component of the database engine may adjust the granularity of locking accurately.

4 Locks On Key Prefixes

Embodiments of locking on key prefixes exploit the key structure of a B-tree to provide key range locking. Consider, for example, a B-tree index for a multi-column "compound key" with columns (a, b, c, d) and with specific values ($a_0$, $b_0$, $c_0$, $d_0$). Any leading prefix such as ($a_0$, $b_0$) could be employed as a resource that locks all index entries with keys starting with these specific key values. In general, a key prefix includes a subset of the key value starting at the beginning of the key value (that is, reading the key value left to right). Examples discussed below use a column as a prefix of a compound key. However, one skilled in the art will appreciate that a key based on a single column may also have a key prefix. For example, the letters "Jo" are a key prefix for key values "Johnson" and "Jones."

It will be appreciated that locks on key prefixes may match with query predicates. For example a query clause "where $a=a_0$ and $b=b_0$" would match the lock on ($a_0$, $b_0$) discussed above. More complex predicates map to only a few very precise locks. For example, a query with the clause "where a in ($a_0$, $a_1$, $a_2$) and b in ($b_0$, $b_1$, $b_2$, $b_3$)" requires only 12 locks, independent of the size of the table and the index.

Locking key prefixes may be competitive with predicate locking and precision locking but without any need for predicate evaluation and concurrency control.

Locks on key prefixes provide efficient locking for single-row updates, because it is possible to lock a single B-tree entry (recall that all B-tree entries are unique in order to permit accurate deletion).

A lock on a specific value covers all B-tree keys starting with these values. In the example above, a lock on the two-column prefix ($a_0$, $b_0$) locks all B-tree keys starting with ($a_0$, $b_0$). In order to prevent phantom records in serializable transaction isolation, however, non-existent key values also need locking. In short, a phantom record may occur when a record is inserted in or deleted from a key range that is locked. A phantom record appears or disappears from a range after the range is accessed, and thus, creates non-repeatable transactions.

In order to solve the problem of phantom records, locks can be defined to cover only a specific prefix, the gap between two actual prefix values, or both. In one embodiment, these locks may include traditional lock modes, such as shown in FIG. 4; in another embodiment, these locks may include new locks modes as shown in FIG. 5.

In one embodiment, existence of specific key values in the current B-tree can be decided only after a B-tree search has proceeded to the appropriate index leaf page. Thus, key locking starts only after the navigation from the B-tree root to the leaf. This navigation is protected by latches, not locks, including the inspection of the current leaf contents.

4.1 Insertion and Deletion of Key Values

During insertion of a key in the B-tree, if a key prefix needs to be locked, the lock mode depends on the existence of a prior B-tree entry with the same prefix value as the new record. If such a prior B-tree entry exists, a key value lock suffices. If no such entry exists, a range lock on the prior key is needed. Note that this range lock only needs to cover the open interval between two pre-existing actual prefix values; there is no need to lock either of the key values at the ends of the gap. A "gap only" lock, such as discussed in connection with FIG. 5, may be used.

Figure 12:
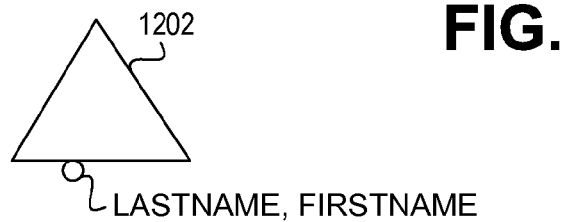
FIG. 12 is a block diagram showing the logic and operations of locking key prefixes in accordance with an embodiment of the invention.

For example, in FIG. 12, a B-tree 1202 is indexed on a key having two columns: last name and first name. As shown at 1204, existing records go from "Johnson, Mike" to "Smith, Sarah" with no records in between. To insert "Johnson, Sally", a prefix key lock is placed on the prefix "Johnson" so no transactions on records with prefix "Johnson" may be made while "Johnson, Sally" is inserted.

At 1206, to insert "Miller, Steve", the gap between "Johnson, Mike" and "Smith, Sarah" is locked. The system locks the absence of the prefix "Miller" so another transaction does not insert a record having the prefix "Miller" (or other last name between "Johnson" and "Smith") during the current insertion transaction. In one embodiment, new lock mode "ØX" on prefix "Johnson" may be used to lock the gap between prefixes "Johnson" and "Smith."

The initial insertion can be a system transaction that does nothing but insert a ghost record, leaving it to the user transaction to turn that ghost record into a valid record. While the system transaction requires a range lock, the user transaction needs to lock only the new key value, not the gap between keys. For example, for the insertion shown at 1206, the gap may be locked using a system transaction for inserting a ghost record for "Miller, Steve", and a follow-on user transaction locks only "Miller, Steve" to flip the ghost record to a valid record. Thus, if a locked key prefix matches the definition of complex objects clustered in the B-tree by shared key prefixes, a new complex object can be inserted without ever locking its neighboring objects or any of their components.

Deletion may follow a similar pattern. A user transaction might simply mark a B-tree entry as a ghost, leaving it to a system transaction to erase the record and its key from the B-tree, or a user transaction might directly erase the record and the key. Erasing a record requires a lock on the record's key in the most restrictive mode, thus ensuring that no other transaction holds any kind of lock on it. Moreover, the gap between neighboring keys must remain locked in order to ensure successful transaction rollback if required. Gaps must be locked at all levels in the lock hierarchy for which a distinct value disappears.

4.2 Lock Escalation and De-Escalation

Embodiments of locks on key prefixes may include lock escalation and de-escalation functionality. Two aspects of escalation and de-escalation for key prefix locking are noted. First, the granularity of locking and the currently active components of the lock hierarchy are uniform across the entire index. Second, structural modifications to the B-tree, such as splitting, do not affect the set of locks required. These observations are based on the complete separation of the physical B-tree structure and the locking hierarchy.

For lock escalation, an intention lock is upgraded to an absolute lock for the appropriate key prefix, and the prior absolute locks can be forgotten or retained for possible subsequent lock de-escalation.

In the embodiment of FIG. 13, B-tree 1202 is indexed on compound key (last name and first name). At 1304, a shared absolute lock is placed on each of "Johnson, Aaron", "Johnson, Andrew", and "Johnson, Brian." A shared intention lock is placed the prefix "Johnson." After lock escalation, as shown at 1306, the shared intention lock on prefix "Johnson" is escalated to a shared absolute lock. This makes the shared absolute locks on "Johnson, Aaron", "Johnson, Andrew", and "Johnson, Brian" unnecessary.

For lock de-escalation, appropriate information must have been retained during the transaction's prior activities such that appropriate locks on longer prefixes can be inserted into the lock manager's hash table, and the absolute lock on the short prefix can be downgraded to an intention lock.

4.3 Granularity Changes

When locking key prefixes, the granularity of locking must be modified uniformly for the entire index. Changes of granularity in locking key prefixes affect the entire B-tree. This is contrasted with locking separator keys in interior B-tree nodes where modifying the granularity of locking affects each node individually. For example, to add a level of granularity, a lock on the two-column prefix $(a_0, b_0)$ may be added to a lock hierarchy that has a lock on the three-column prefix $(a_0, b_0, c_0)$. Thus, the set of key prefixes that are locked has been changed (increased in this example). Embodiments of granularity changes in key prefix locking include an immediate method and a delayed method. As discussed above with separator keys, granularity changes of key prefix locks may occur dynamically.

Referring to FIG. 14, a B-tree 1402 is indexed using compound key (last name, first name, middle initial). An absolute lock has been placed on key prefix "Johnson, Aaron", as shown at 1404. A granularity change proceeds as follows. At 1406, a new IS lock is added to all "Johnson" prefixes, shown at 1406. The IS lock is then escalated to an S lock on all "Johnson" prefixes and the S lock on key prefix "Johnson, Aaron" may be removed, as shown at 1408. When a granularity change is made so that the absolute lock is changed to all "Johnson" prefixes, then the number of records locked increases.

In the delayed method, a system transaction locks all distinct key values at the new granularity of locking across an entire index. In contrast, hierarchical locking based on separator keys can modify the granularity of locking one B-tree node at a time.

The immediate method analyzes existing locks in order to acquire only those locks that are truly needed for specific active transactions. Hierarchical locking using key prefixes may be more precise than alternative locking methods and thus there are fewer locks to manage. Note that there might be transactions that do not need any new locks, namely those transactions that own absolute locks at a granularity of locking larger than the granularity being added. This aspect also holds true for separator key locks.

When removing an existing granularity of locking, it is necessary to wait for the release of absolute locks at that level. In one embodiment, the database engine waits for an IX lock competing with each such absolute lock held by a user transaction.

Embodiments herein may perform hierarchical locking using key prefixes. Key prefix locking reflects the matching between query predicates and key prefixes. A single mechanism permits locking large ranges or individual B-tree records, and thus supports equally well decision support, transaction processing, and other applications with similar access patterns.

Key prefix locking matches with equality predicates and "in" predicates, which are common both in single-table selections and in joins. Thus, often a single key prefix lock may cover precisely the index entries needed, neither more nor less, and consistency and serializability among such a set of index entries are guaranteed, even in transaction isolation levels lower than strict serializability. This aspect is effective for using key prefix locking for non-unique indexes including indexes on foreign key columns. This advantage pertains not only to searches on the full index key but for any prefix of the key. If the leading key column is not specified and multiple index probes are required, a single lock per probe may suffice.

If master-detail clustering is supported based on equality of search columns in a B-tree, locking key prefixes provides support for locking complex objects. For example, if orders and order details are co-located within a B-tree index based on equal values in the common column of order numbers, locking an order number locks an entire order object and all of its component records. A single lock can also cover a large object (for example, a customer with multiple orders, shipments, invoices, and payments). Insertion and deletion of one complex object does not require any lock on its neighbors.

Locking prefixes may also be used with partitioned B-trees. A partitioned B-tree includes an ordinary B-tree with an artificial leading key column that indicates partitions or, during sorting and index creation, run numbers. The first granularity of locking is the partition identifier, which permits efficient operations on partitions such as merging partitions, creating an entire partition during data import, and dropping a partition while purging old data from a data warehouse.

5 Conclusion

Embodiments herein provide schemes for hierarchical locking. In one embodiment, new lock modes are presented that enable locking of keys and gaps between keys. These new lock modes not only permit additional concurrency compared to earlier designs but also avoid unconventional locks modes that violate traditional two-phase locking.

Embodiments herein include key range locking using separator keys found within a B-tree structure. Key range locking in parent and grandparent nodes scales with additional B-tree levels and adapts to skewed or unpredictable key distributions. The ability to lock a B-tree in levels between a root node and individual keys eliminates the dilemma between the massive overhead due to many individual locks on keys and massive concurrency contention due to a single B-tree index lock to lock the whole B-tree. Moreover, splitting pages at keys that minimize the size of truncated separator keys matches the key ranges in parent and grandparent nodes to clusters of records and complex objects. System transactions may be used for insertion and deletion of records in separator key locking.

Embodiments herein include key prefix locking of key ranges. Locking prefix values of search keys matches query predicates and complex objects in merged indexes. Insertions and deletions of records within the locked key range may be performed using system transactions.

Embodiments herein include dynamic granularity changes in separator key locking and in key prefix locking. Dynamic changes may be made in the lock hierarchy in response to skew in the data or in the access patterns. These dynamic changes are online and incremental such that they minimize disruption to ongoing transaction processing and they may be invoked on demand. Granularity changes may be performed using an immediate method or a delayed method.

Various operations of embodiments of the present invention are described herein. In one embodiment, one or more of the operations described may constitute computer readable instructions stored on computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
placing a lock on a separator key of an index node of a B-tree index, wherein the lock locks a key range from the separator key to a next separator key; and
merging a first child node and a second child node of the index node into a merged node when locks on the first child node and the second child node do not conflict, wherein merging includes removing the separator key from the index node and applying the lock from the removed separator key to a separator key for the merged node.

2. The method of claim 1, further comprising: splitting a child node of the index node, wherein splitting the child node includes inserting a new separator key in the index node; duplicating the lock on the separator key; and applying the lock to the new separator key.

3. The method of claim 1, further comprising:
escalating the lock on the separator key including:
upgrading the lock from an intention lock to an absolute lock; and eliminating locks on keys in the child nodes of the index node.

4. The method of claim 1, further comprising:
de-escalating the lock on the separator key including downgrading the lock from an absolute lock to an intention lock and placing locks on keys in child nodes of the index node.

5. The method of claim 1, further comprising:
locking separator keys in only a subset of index nodes within the B-tree index, wherein the index node is in the subset of index nodes; and
changing the set of index nodes in which separator keys are locked.

6. One or more computer readable storage media including computer readable instructions that, when executed by a computing device, perform the method of claim 1.

7. A method, comprising:
placing a lock on a key prefix of a B-tree index, wherein the lock locks each key in a key range having the key prefix: and
inserting a new key having the key prefix in the key range, wherein inserting the new key includes:
inserting a ghost record in the key range by a system transaction; and
turning the ghost record into a valid record by a user transaction, wherein the user transaction locks only the new key.

8. The method of claim 7, further comprising:
deleting a key having the key prefix from the key range, wherein deleting the key includes:
marking the key as a ghost record by a user transaction; and eliminating the ghost record by a system transaction.

9. The method of claim 7, further comprising:
escalating the lock on the key prefix including upgrading the lock from an intention lock to an absolute lock.

10. The method of claim 7, further comprising:
de-escalating the lock on the key prefix including downgrading the lock from an absolute lock to an intention lock.

11. The method of claim 7, further comprising:
locking a subset of key prefixes for the B-tree index, wherein the key prefix is in the subset of key prefixes; and
changing the subset of key prefixes to lock.

12. One or more computer readable storage media including computer readable instructions that, when executed by a computing device, perform the method of claim 7.

* * * * *